March 19, 1957 — L. T. STAATS, SR — 2,785,613
APPARATUS FOR SOIL PREPARATION
Filed April 14, 1954 — 5 Sheets-Sheet 2

Fig. 3.

INVENTOR
*Louis T. Staats, Sr.*
BY *Charles M. Thomas*
ATTORNEY

March 19, 1957 L. T. STAATS, SR 2,785,613
APPARATUS FOR SOIL PREPARATION
Filed April 14, 1954 5 Sheets-Sheet 3

INVENTOR
Louis T. Staats, Sr.
BY Charles M. Thomas
ATTORNEY

March 19, 1957 L. T. STAATS, SR 2,785,613
APPARATUS FOR SOIL PREPARATION
Filed April 14, 1954 5 Sheets-Sheet 4

INVENTOR
Louis T. Staats, Sr.
BY Charles M. Thomas
ATTORNEY

United States Patent Office 2,785,613
Patented Mar. 19, 1957

2,785,613

APPARATUS FOR SOIL PREPARATION

Louis T. Staats, Sr., Lewisville, Pa.

Application April 14, 1954, Serial No. 423,075

1 Claim. (Cl. 97—10)

This invention relates to a new apparatus and method for the preparation of farm land, especially the topsoil and subsoil thereof prior to planting in such manner as to result in a prepared seed bed of fine quality. More particularly, my invention is directed to an apparatus which breaks up the subsoil, while at the same time stripping off and elevating the topsoil to a means for grinding it, together with any vegetation or other material adhering thereto, to a predetermined and desired degree of fineness. An excellent mulch is thus formed. Such mulch is then redeposited on the surface of the plowed underneath layer. Following this procedure the seed bed so prepared is firmly tamped in place by a packing wheel or tamping roller of suitable weight and dimension. By the use of my novel apparatus all of these steps are completed in one swift, continuous and efficient operation.

Heretofore the preparation of a proper seed bed prior to planting has required several different types of farm equipment, each used individually and in different stages of soil preparation. For example, in the ordinary cycle of land preparation, plowing equipment is generally followed by cultivating apparatus, harrowing devices, etc., to suitably reduce the soil to the desired texture and quality for seed planting. Where the surface of the soil prior to plowing is covered with substantial amounts of vegetation, additional devices, such as stalk cutters, disc harrows and related equipment must be used repeatedly to reduce this soil to the proper degree of fineness for a seed bed.

As stated, by the use of my invention these different types of equipment, used in separate, time-consuming steps, are eliminated; my invention makes it possible to achieve subsoil and topsoil preparation, suitable for seeding, in one quick and simplified operation without the use of more than one single piece of equipment.

It is, accordingly, a primary objective of this invention to provide apparatus making possible the complete preparation of a seed bed in one single operation.

It is a further objective of the invention to provide a soil preparation apparatus which is light in weight, easily drawn by the common type of tractor, durable in construction, and yet of such simplicity that its fabrication is most economical.

Another object of the invention is the provision of apparatus which enables simultaneous preparation of both subsoil and topsoil, thereby deleting the necessity of more than one piece of equipment to prepare each strata of soil at different levels.

A further object of the invention is the provision of apparatus which, when coupled in chain gang fashion of planters or seeders with known types, will enable the farmer not only to prepare a proper seed bed in one operation but to plant also an entire crop in a single operation, thus saving untold man hours, as well as reducing the time during which the tractor is in use. The result is to obtain not only a better seed bed, scientifically prepared, but a more flexible planting schedule.

A further objective of my invention is the provision of apparatus that will easily raise or lift the soil, including adhering vegetation and other materials found thereon, it being appreciated that the power required to break clods, sods and other materials including rocks, is much less when the material is raised up and out of the ground than when it is still in the ground.

Another object of the invention is to provide means for simultaneous actuation of coulter, scoop and subsoiling spike assembly from transporting position to position for immediate use. This is accomplished simply, with great ease, and relatively quickly.

Finally, an important advantage and objective of the invention is an apparatus which is so designed as to facilitate the addition of soil treating agents of various types to the topsoil layer. The mechanism permits the addition of fertilizer and insecticides to the mulch which it prepares in a manner that will result in even distribution thereof throughout the soil.

Other objects and advantages of this invention will be apparent from a more detailed description thereof and by reference to the drawings of the invention wherein.

Prefatory to a more detailed description of the invention the following delineate briefly the important and co-acting elements thereof:

The coulter

Although only one coulter is shown, two may be used when necessary. It is obvious that certain conditions may exist where, for best operation, a coulter should be mounted upon each side of the mechanism. Thus, certain heavy vegetation, such as honeysuckle, would indicate the use of two coulters, one mounted on each side. Both could be identical for all practical purposes, to the coulter shown in this embodiment of my invention.

In any event, in the instant case the coulter herein described is located on the right side and at the forward end of the frame. It is adapted to take one of two optional positions: transport, or out of the way position; and lowered, or operative position. The transfer from one to the other of these positions is obtained by swinging the coulter and its accompanying structure upon an appropriate pivot and by hydraulic media. Change of position of the coulter is automatically accompanied by corresponding change of position of the cutting and digging apparatus.

The scoop, cutter and conveyor

Centrally located with respect to the carriage, a scoop or elevator ramp is provided which has sharp forward cutting elements. This scoop is propelled forwardly at furrow level to pick up the topsoil as well as top vegetation. The preferred depth of cut is in the range of approximately five inches to six inches. The cut material is transported through the length of the scoop to a means for grinding the cut materials to a desired degree of fineness. Because of vegetation usually present a fine mulch results, and this can be improved by the addition of other materials to the cut materials just before entry to the hammer or other equivalent mill.

Subsoil plow means

This apparatus is located immediately under the scoop and in the present embodiment, attached to its under side. This digging means is in effect a series of small plows stretching transversely of the swath being prepared for seeding. The subsoiling spikes which are so supported are designed to extend to the subsoil level and plow, or disturb, the soil at that level, thus preparing it for the later addition of the ground-up topsoil. The preferred depth of cut of this assembly is approximately an additional five inches to six inches, or total depth with relation to the surface, of approximately ten inches to twelve inches. These subsoiling elements are so mounted as to pivot upwardly and thereby surmount heavy, solid objects in the path of the assembly in order that its progress is not impeded.

Hammer mill

Rearwardly of the scoop and digger mechanism is located a hammer mill designed to be operated at high speed so as to grind in rather fine proportions the material discharged to it from the topsoil scoop. These materials are subsequently discharged over the area which has been plowed to a subsoil level in the described manner. The hammer mill is immediately adjacent the outer end of the elevator ramp so that all material is necessarily subject to the repeated impact of the hammers. The sides of the cover of the mill are extended downwardly so as to provide a discharge conduit for the ground material.

Rotary packer

When the rear wheels of the mechanism are elevated in a manner to be hereinafter explained, the rear end of the carriage supporting the various elements described above rests upon a drum or roller of smooth surface and weighted sufficiently to perform a packing or tamping operation, as well as a smooth surfacing function, as it progresses forwardly over the prepared seed bed. The double strata of prepared topsoil and subsoil is thus firmly bedded down and ready for planting. The drum here referred to may be supplanted by similar devices such as those having a corrugated or grooved surface.

Figure 1:
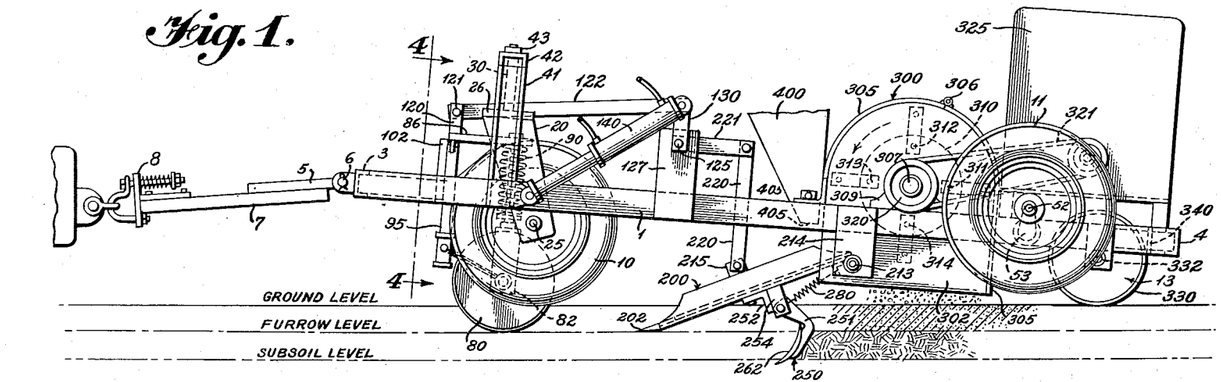
Figure 1 is a side elevation view showing a preferred embodiment of the invention with coulter, subsoiler spikes and cutting scoop lowered to cutting and digging positions.

Referring more particularly to the drawings, it will be seen that this combination apparatus is mounted upon a rectilinear frame of four channel beams, designated as 1, 2, 3 and 4. Such frame or carriage, in its transport or non-operative condition, is supported upon three wheels. Wheel 10 is the single forward supporting wheel, and wheels 11 and 12 provide the rear support. All of these may be of standard tread dimension such as 6 x 15 or of comparable tread size. When the assembly is in cutting position, as shown in Figure 1, the roller packer 13 affords support for the frame while at the same time it also performs the important function of tamping down the prepared seed bed. With reference to the supporting wheels just described, it is to be understood that the forward supporting wheel 10 may be omitted. As an alternative, and in smaller versions of the invention, the front end of the frame can be directly attached to the usual tractor drawbar without alteration of the functions or results obtained.

The entire unit, being adapted to be drawn by a farm tractor, is provided with a hitch plate 5 having an extending tongue 7. The plate is pivoted as at 6 to the frame. A spring hitch 8 of known type is used to interconnect the tongue 7 of the hitch plate to the hitch lug found on known types of tractors.

Figure 4:
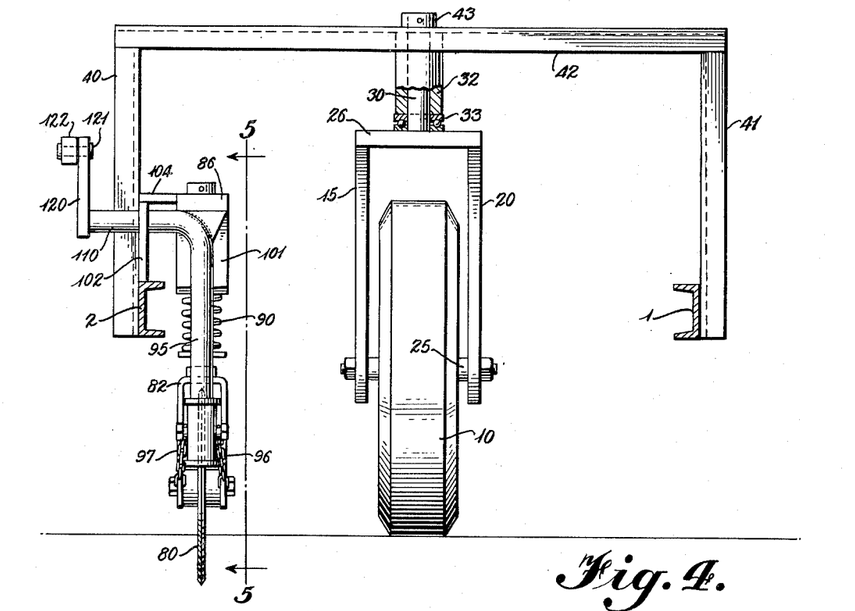
Figure 4 is a front detailed elevation view, partially in section, illustrating the structure of the front supporting wheel and the mechanism of the coulter.

The forward supporting wheel 10 is pivoted in a manner to permit lateral deflection thereof, and peculiarly mounted so that it tends to ride well over any obstacle. Thus this wheel is positioned between the two opposing plates 15 and 20 to form a yoke or fork. The sides 15 and 20 thereof are suitably journaled to accommodate a common type of bearing 25 for the forward wheel. The top plate 26 of this fork element is rigidly affixed to a bar or pivot 30, the latter riding within a collar 32. For ease of operation the usual type of roller bearing race 33, is preferably placed between this collar 32 and the top plate 26 of the wheel supporting yoke. The wheel is mounted for lateral deflection only and thus the pivot 30 is locked in place with a collar 43 securely keyed or otherwise affixed to the pivot above the frame from which the wheel assembly is suspended. The frame supporting the front wheel is rectangular, having two sides, 40 and 41, and top member 42, all of angle or channel iron. Referring to Figure 4, the manner in which collar 32 is located on the underside of the top frame member 42 and the collar 43 at opposite side thereof, thus maintaining the wheel in position for lateral movement only, will be fully appreciated.

Figure 2:
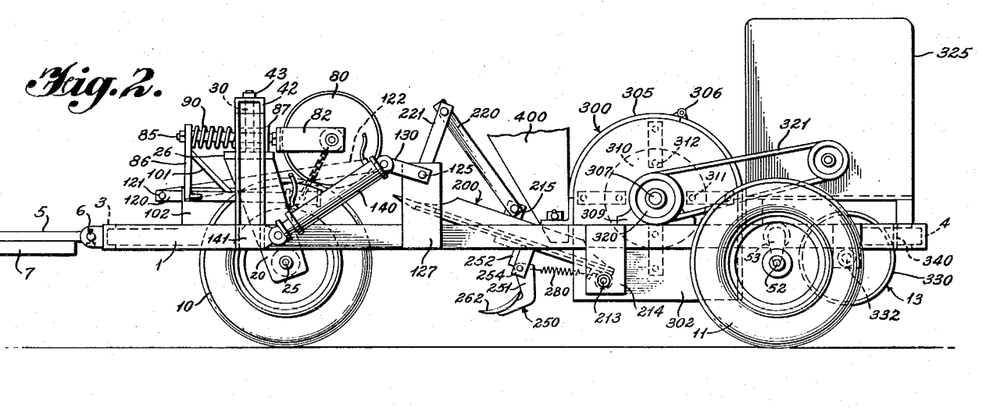
Figure 2 is an elevation view of the invention, similar to that of Figure 1, but illustrating the raised position of coulter, subsoiling spikes, and scoop.

Referring to Figures 1 and 2, it is seen that the side plates 15 and 20 of the fork which carry this forward wheel are canted rearwardly, or at an angle to the vertical of approximately 15°, so that the axle upon which the wheel rides is substantially off center to its opposed support pivot pin 30. This off center positioning of the axle enhances the riding quality of this front support, and permits obstacles to be more easily surmounted, even though vertical movement is not provided for. It is to be understood, of course, that a spring mount, permitting vertical movement much as in the case of the coulter assembly to be described, can be substituted for the specific structure herein described.

As indicated in the foregoing, the frame is lowered at its rear end by the simple expedient of raising the axles of these wheels from a position underneath the frame to one sufficiently above it as to bring the rotary tamper in contact with the ground. The scoop digger blades, the subsoiling spikes and related apparatus, when lowered to operative position, are thus brought to a proper subsoil level.

Figures 6, 7, 8:
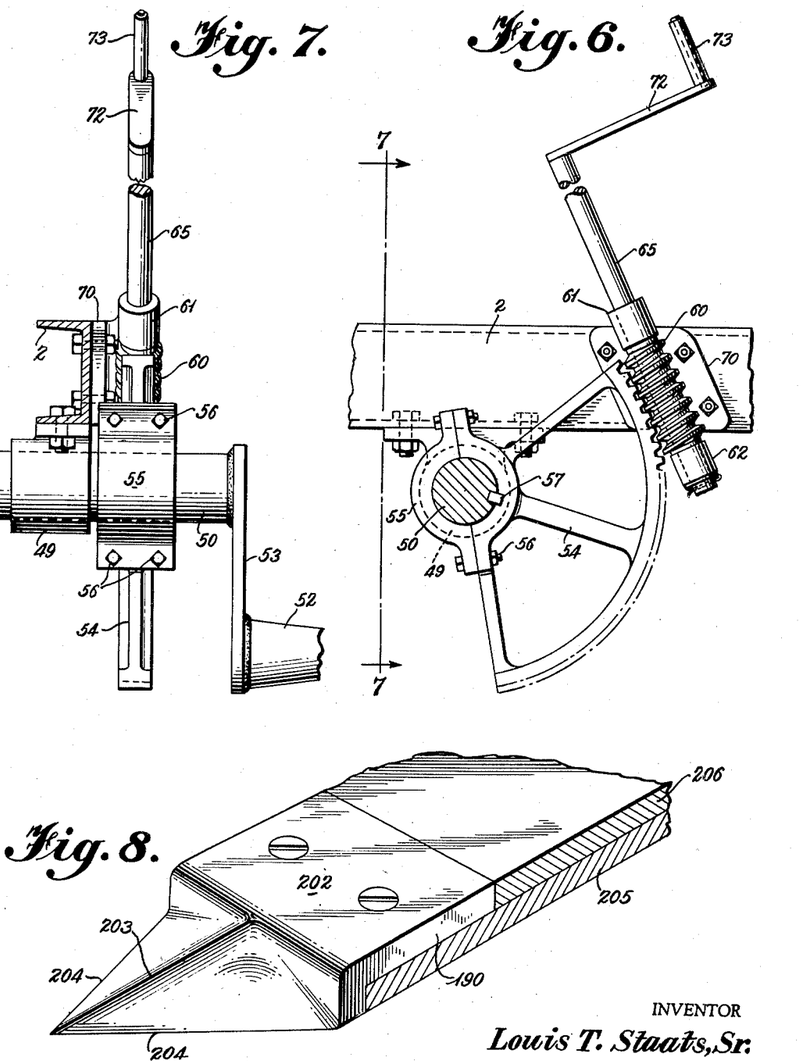
Figure 6 is a detail view in side elevation, partially in section, of the rear wheels raising and lowering mechanism.
Figure 7 is a section view taken on the line 7—7 of Figure 6.
Figure 8 is a detail perspective view, partially in section, of one of the digger blades appended to the front end of the scoop or elevator ramp.

Particular reference to Figures 6 and 7 should make clear how elevation of the rear wheel to non-operative position is accomplished. As here shown, a transverse shaft 50 is mounted in opposed bearings 49 which, by the use of suitable lugs attached thereto, are each secured to opposite sides of the frame members 1 and 2. Intermediate one of these supporting wheels and the frame is positioned the adjusting mechanism, the latter causing rotation of the shaft 50, consequent rotation of right angular element 53 welded or otherwise secured thereto, and resultant displacement in the desired amount of the stub axles 52. The latter, of course, provide supports for the rear transport wheels and each is also secured by suitable media, here indicated as welding, to the intermediate link 53.

Rotation of the transverse shaft 50 to accomplish this function of displacement upwardly of the stub axles is accomplished by keying said shaft by means of a key 57 to a worm wheel sector 54. The latter is also maintained in position upon shaft 50 by a hub portion 55 embracing that shaft and being affixed tightly to the sector gear hub by means of suitable bolts 56.

Worm wheel 60, for rotation of the sector gear 54 in the desired direction, is journaled in the two bearings 61 and 62, the latter being integral with or rigidly secured to bracket 70 which is bolted, as indicated in Figure 6, to the adjacent frame member 2. The worm gear is either integral with or keyed to extension 65 terminating in right angular element 72, forming, with the handle 73, a hand manipulated winding mechanism.

The operation of the foregoing elevating means should be apparent. When the worm gear is rotated sufficiently to move the sector to position sufficient to raise the rear transport wheels substantially off ground level the rear end of the frame is consequently lowered. The apparatus is then in cutting, digging and tamping position, as depicted in Figure 1. It is apparent that suitable stops may be provided to prevent the sector wheel 54 from excess rotation, or sufficient rotation to run off the worm gear. It is also to be appreciated that hydraulic means may be utilized for the raising or lowering of the rear transport wheels. Such could take the form of a hydraulic cylinder employed to rotate, by direct interconnection therewith, the described sector wheel 54. This would be particularly desirable in larger embodiments of the invention.

The ground cutting elements of the invention, as stated in the foregoing, are three in number. They consist of the following: The coulter apparatus, which slices vertically to the furrow level on one or both sides of the assembly; the scoop 200, with forwardly projecting digger blades to peel off the surface to the furrow level; and the subsoiling spike assembly, generally indicated in Figure 9 at 250, which plows to the indicated subsoil level. These units, raised and lowered in unison through a pivot-link arrangement actuated by a hydraulic cylinder, will be described separately in the order given.

As stated, the coulter may comprise a single vertical blade 80 rotatably mounted between the parallel sides of a forked element 82. As an alternative a similar coulter means may be positioned on each side of the frame, instead of on just one side, as particularly described in this embodiment of the invention. The fork 82 has extending from its top a rod 85 which is rigidly secured in any suitable manner to a bumper plate 86. Between this bumper plate 86 and an opposing plate 87, also mounted upon rod 85, but adjacent the aforesaid fork, is positioned a compression spring 90.

The assembly of the coulter thus far described is secured to bumper plate 86 in such manner that vertical movement is possible but turning of the blade laterally or movement from side to side is not. Thus rod 85 may be keyed to plate 86 to perform this function. Having the compression spring located in the manner described exerts thrust downwardly but permits the blade 80 to rise vertically under upward pressure such as by encountering an extremely hard obstruction. Hence the entire mechanism may continue its forward motion without undue interference as would not be the case if allowance was not made for vertical movement.

It is understandable that considerable pressures rearwardly, during cutting, are necessarily exerted against the coulter structure. To provide additional support thereto a lead rod 95 is positioned immediately in front of the coulter assembly. This rod is flexibly interconnected with the fork 82 by two chains 96 and 97 extending from the lower portion of such rod to a point near the bearing of the coulter wheel 80. The leading rod 95 and bearing plate 86 are secured together as by welding or some equivalent media, the attachment being additionally strengthened by an angular brace 101 also braised or welded to these two structures.

Figure 5:
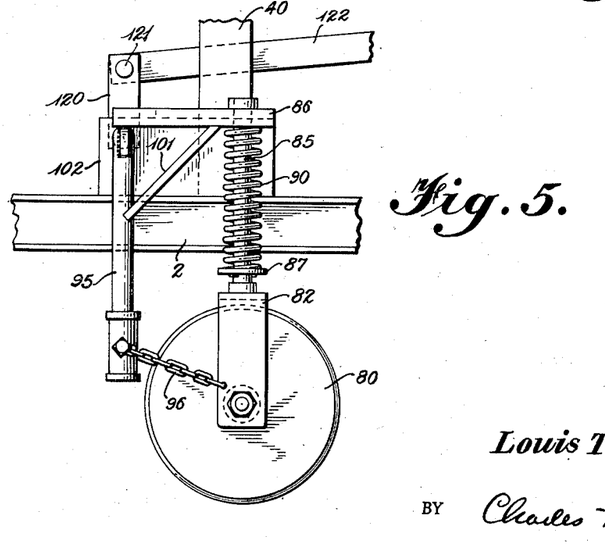
Figure 5 is a section view taken on the line 5—5 of Figure 4.

The coulter assembly is a pivoted one so that it can be rotated to the cutting position shown in Figure 1, and reversely rotated to an out of the way, non-cutting position as exhibited in Figure 2. To this end, a pivot plate 102, secured to the frame member 40, is provided with an opening to receive a suitable pivot on which the coulter assembly may rotate. In the embodiment herein shown the pivot comprises an extension 110 of the leading rod 95, but displaced right angularly to said rod. Referring to Figures 4 and 5 it will be understood how this extension 110, and with it the entire coulter assembly, is readily pivoted in the said opening in pivot plate 102.

The coulter assembly, in moving from one of the two alternative positions to the other, as shown in Figures 1 and 2, is motivated by a hydraulic cylinder 140. Certain linkages transmit the power of this cylinder to the pivot upon which the coulter rides. Thus, referring to Figure 5, a link 120 is rigidly secured to the pivot 110. Link 120 is in turn pivoted, by means of pin 121 to a longer link 122 extending rearwardly for interconnection with a transverse shaft 125. This interconnection again takes the form of another link 131 shown in vertical position in Figure 3. The latter link is rigidly secured to the aforesaid shaft in any satisfactory manner so that with rotation of the shaft link 131 is forced to the right or left (viewing Figure 3), resulting in a corresponding movement, forward or rearward, of link 122. Such movement is, of course, transmitted to the pivot 110 of the coulter arrangement, whereby the latter is raised or lowered at the option of the operator, to one or the other of the two positions depicted in Figures 1 and 2.

Figure 3:
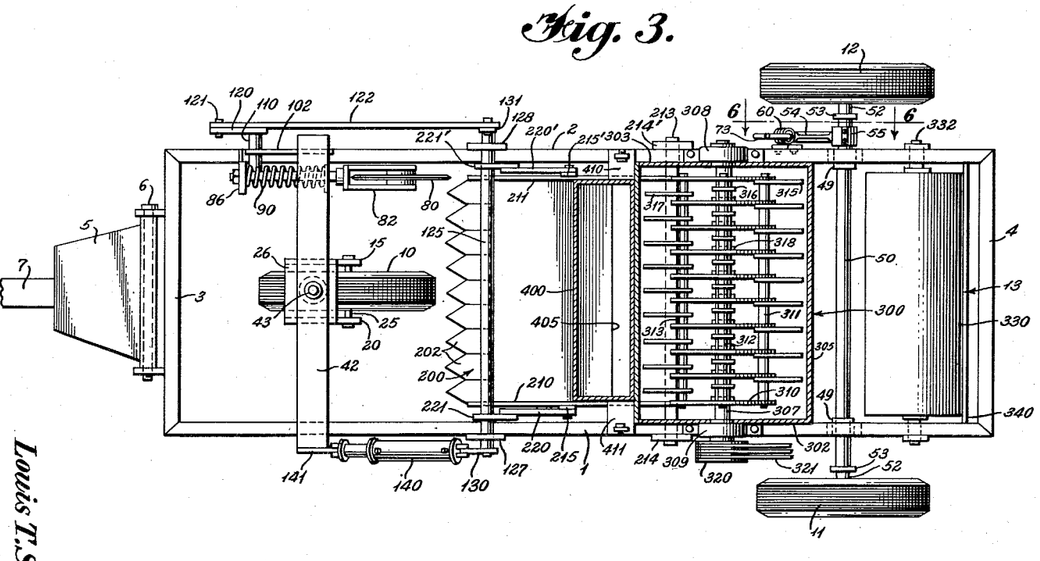
Figure 3 is a plan view of the invention; partially in section, showing the arrangement of the hammer mill.

The referred to transverse shaft 125 is journaled in suitable bearings positioned in lugs 127 and 128, the latter being affixed to the frame members 1 and 2, respectively. As seen in Figure 2 the hydraulic cylinder 140 is pivoted to an element 130 which corresponds to its counterpart, link 131, on the opposite side of the carriage. The cylinder 140 is also pivoted at its opposite end to a fish plate 141, the latter being secured to frame member 1. It will thus be appreciated that when hydraulic pressure is admitted to the cylinder 140 in a direction to extend the piston rod thereof the link 130 is thrust to the right, or rearwardly, with consequent clockwise movement of the shaft 125 (Figure 3). This rotary motion of the shaft is transmitted through link 122 and the other related parts to depress the coulter from the position shown in Figure 1 to that shown in Figure 2. Conversely, reverse movement or contraction of the piston rod lifts the coulter from its working position shown in Figure 1 to the out of the way place indicated in Figure 2.

The hydraulic cylinder is of the usual type and may be controlled by four-way valve permitting admission of fluid at either end of the cylinder to cause travel of the piston in the desired direction. The cylinder is adapted, of course, to be interconnected with the pressure supply of the hydraulic fluid pump commonly found on most farm tractors.

Another cutting element referred to in the foregoing is the scoop 200. During preparation of the seed bed this is maintained at the so-called furrow level, or the level shown in Figures 1 and 9. When not in use it is lifted out of the way as shown by the dotted line in Figure 2. This scoop and elevator ramp 200 is provided with a double bottom consisting of two plates 205 and 206. The top one of these plates is replaceable, and thus merely screwed to the lower to permit its removal when worn. At its forward end the scoop 200 is provided with a series of unique digger blades 202 shown in greater detail is Figure 8. These terminate in a sharp point at their forward ends and have as well sharp converging sides 204, thus taking the shape of a sort of double plow. They are also fabricated with a central ridge 203 between these sides, as generally indicated in Figure 8. They are positioned on the scoop with their base portion 190 in alignment with the top plate 206 of the double bottom.

The sides 210 and 211 of the scoop form a guideway for the material that is cut by the blades 202. Since in operation the entire apparatus is drawn forwardly, material cut at the furrow is forced up the scoop to the hammer mill 300 located at the top thereof. It is to be noted that the sides of this scoop have the configuration indicated generally at 212 or terminate in edges which arc downwardly and inwardly toward each end of the scoop. This configuration of the sides of the scoop has a definite function: It facilitates movement forwardly of the scoop through the soil. As may be readily appreciated, if the sides of the scoop were provided with straight front edges such would offer considerable resistance to the forward motion thereof, especially if hard objects such as rocks are encountered. Thus, the scoop of the instant invention with its curved sides, clearly shown in Figure 9 and as described herein, is not impeded by rocks or other objects; such will slide up the curved edges and fall either into or outside the scoop, but without material resistance to the forward motion thereof.

A transverse shaft or hinge pin, 213, positioned in two retaining lugs 214 and 214', permits pivoting of the scoop to the positions heretofore referred to. The upper end of this cutting scoop element is welded as at 217 to a collar or hinge bearing 218, the latter being permitted to revolve upon the transverse hinge pin 213.

As stated, this motion of the elevator ramp 200 from one cutting position to a position substantially above the furrow level is accomplished by action of the same hydraulic piston 140, such motion being simultaneous with that of the coulter mechanism. Here again, linkages upon both sides of the scoop permit this operation. For example, lugs 215 and 215' are fitted on each side of the scoop and provided with pivoted linkages 220 and 220'. These transmit movement through additional links 221 and 221'; the latter being securely keyed or otherwise affixed to this shaft so that they respond fully to the motions thereof. Thus when cylinder 140 is actuated in either direction the links just described respond accordingly to either raise or lower the scoop or elevator ramp.

Such travel of the scoop is, of course, simultaneous with the movement of the coulter mechanism. Again referring to Figure 1, it is seen that coulter and scoop are here shown at furrow level with the cylinder in extended position. Upon contraction of the hydraulic cylinder, however, the shaft 125 rotates in a counterclockwise direction, causing the coulter and scoop to simultaneously move upwardly to the position indicated in Figure 2.

Figures 9, 10:
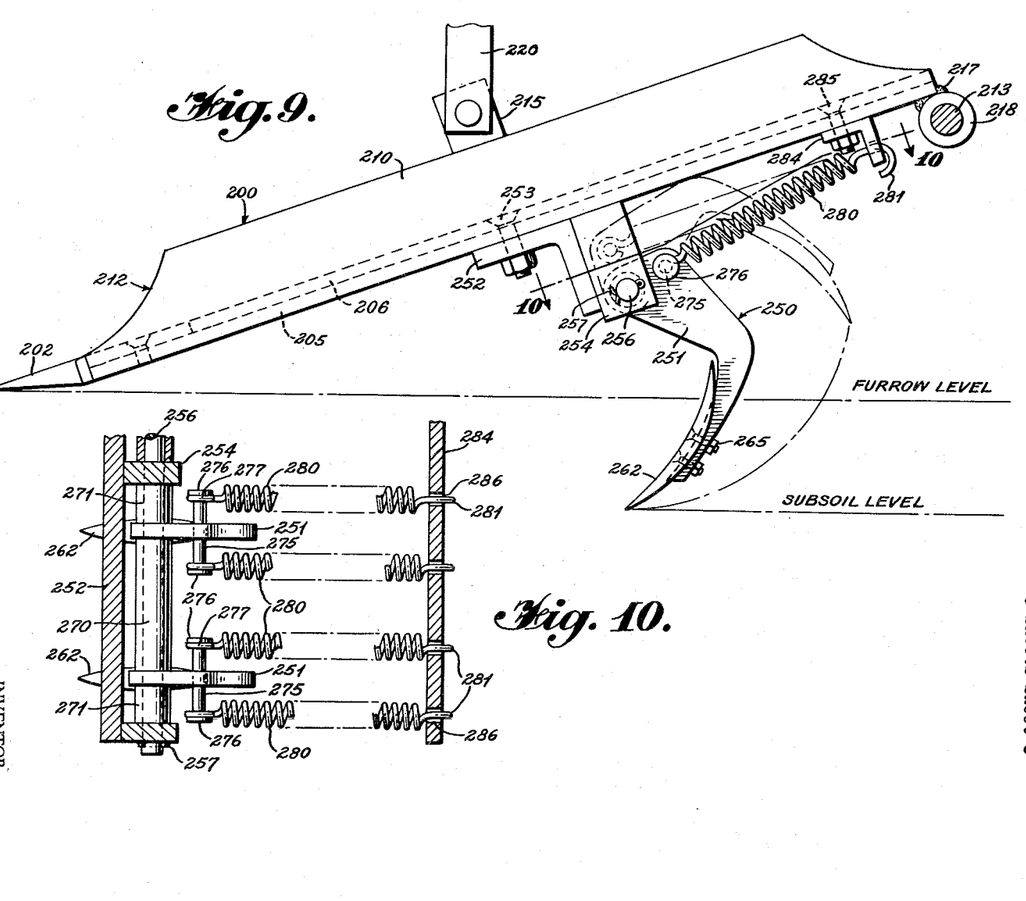
Figure 9 is a detailed view in side elevation illustrating the construction of the scoop and digger blade apparatus.
Figure 10 is a detailed view, partially in section, illustrating the manner of mounting the digger blades for pivotal movement.

The third cutting or digging mechanism, operating in conjunction with that already described, is attached directly to the bottom side of the described scoop 200. This latter assembly, the subsoiling tooth assembly, is generally indicated at 250 (Figure 9). The supports for the teeth here used are shown at 251 and are of hook-shape configuration. Each of them terminate in a fashion to receive a series of reversible subsoiling spikes or teeth 262. Such teeth are retained on the support members 251 by the use of suitable bolts 265. They are reversible in the same sense that they are the same configuration at each end and when one side has been worn through use that side may be positioned with the worn cutting edge at the top so that a new point is then presented to the subsoil.

These teeth and the related apparatus are secured to the bottom of the scoop 200 in the following manner: An angle iron 252, secured by bolts 253 to the bottom of the elevator ramp, presents a surface to which a series of lugs 254 are attached in any suitable manner. Each of these lugs is apertured to receive a shaft 256 upon which the subsoiling spike supports 251 are permitted to revolve, the said shaft and related elements of the assembly being retained by such means as cotter pin 257. Each of the blade supports 251 is, of course, suitably apertured to ride upon the said shaft 256. They are spaced from each other by spacers 270 and from the series of supports 254 by spacers 271.

The subsoiling spikes, when mounted as described, rotate on the axis 256 so that when they encounter a hard obstacle at the subsoil level they will ride upwardly over the obstruction, as shown in dotted line in Figure 9, returning immediately thereafter to the position shown in solid line in the same figure. In the preferred embodiment of the invention six such teeth 262 are mounted transversely with respect to and underneath the scoop 200.

To maintain these subsoiling spikes in a downward position with sufficient force to perform preparation of the subsoil, a series of tension springs 280 are employed. These springs are of substantial size and strength and two of them jointly act upon each of the blade assemblies 250. For example, each of the blade supports 251 is provided with a transverse pin 275 at the upper portion thereof, the ends of such pins terminating in collars or buttons 276 for retention of such springs in position. At one end of each of these springs a loop or eye 277 is formed to encircle such pins 275; and the opposite end of each of these tension springs is bent to hook or U-shaped form, such as that indicated at 281. These hooks 281 are inserted in appropriate apertures 286 in a supporting base 284. The latter extends perpendicularly to the bottom of the scoop and is affixed thereto in any common manner, as by the usual bolts 285.

It will be seen that the line of force of such tension springs is directly down the axes thereof toward the pivot point of each of the spike supports. This, of course, is the center, in each instance, of the shaft 256. Hence, to rotate these assemblies such line of force asserted by each pair of springs would necessarily have to be overcome. The amount of tension placed upon each of the blades by these pairs of springs can be readily ascertained by those skilled in the art, and would be that amount as would enable the blades to perform a proper digging or plowing operation at the subsoil level, but also an amount sufficient to permit the blade to ride over hard obstacles as they are encountered in the forward motion of the assembly.

From the foregoing, it will be appreciated that three separate cutting mechanisms have been described. The first, the coulter, cuts one or both edges of the plot to be treated; the scoop or elevator ramp and its blades 202 scrape off the surface level or topsoil strata; and the subsoiling spikes individually accomplish a sort of plowing effect at the subsoil level.

As previously indicated, an important function of the instant invention is to lift or elevate the topsoil from the surface of the ground to a position where it can be more readily broken down to a desired degree of fineness. Thus the scoop operates to remove soil to be thus treated and elevate it from the furrow level to a point above ground level. In the preferred operation of the invention the scoop removes from five to six inches of such topsoil, although it may be adjusted to penetrate to a maximum depth of ten inches. The operation of the scoop and its forwardly projecting blades 202 is quite different from the action of the series of transverse subsoiling spikes. The latter simply disturb or break the soil from the subsoil level to the furrow level, generally some five or six inches below the depth reached by the scoop.

The apparatus now to be described is that which grinds the soil so removed and elevated by the scoop to the desired degree of fineness, redeposits it over the plowed subsoil and tamps it in place in such fashion as to result in a prepared seed bed of fine quality.

The hammer mill used at this stage of soil preparation is generally indicated by the numeral 300. It is enclosed by a circular cover 305 hinged as at 306 for ease of access to the hammer mill itself. It will be observed that the sides of this cover 302 and 303 extend downwardly a substantial distance as indicated in Figures 1 and 2 to form a discharge chute. The front is open sufficiently to permit discharge to the hammer mill of the material fed upwardly by the conveyor ramp.

The mill itself, of the rotary type, is mounted upon the drive shaft 307 which in turn is rotatably secured in the usual type of bearings 308 and 309. A series of circular discs or plates 310 are mounted in spaced relationship upon this drive shaft 307. They are separated from one another by suitable spacers in any usual manner. As shown in the embodiment of the invention herein described, ten such discs are provided.

These discs furnish support for the numerous pivoted hammers which, due to the centrifugal force generated at high speed rotation, swing out radially of the axis of shaft 307. When the mill is in operation, the hammers assume the positions shown in Figure 3.

The discs 310 carry four hammer supporting rods 311, 312, 313 and 314, respectively. Each rod is supplied in this instance with ten hammers which are free swinging upon the said rods. It is to be noted that each series of hammers is spaced laterally with respect to the adjacent series. Thus hammers 315 upon the rod 311 are placed in what might be termed the "one" position, or immediately adjacent each of the respective plates. On the top or adjacent rod 312 the hammers 316 are spaced to one side of the hammers 315, occupying what might be termed the "two" position. Continuing, hammers 317 on the rod 313 are in "three" position and hammers 318 on the bottom rod are in a "four" position. With this arrangement the series of hammers entirely cover the opening into the said trough so that all material fed to the mill is subjected to rapid repeated pulverizing blows.

The hammer mill is driven by means of the usual belt pulley 320 and belt drive 321, obtaining power from a gasoline engine of usual construction enclosed in the casing 325. In the preferred embodiment of the invention a 33 horsepower motor of 2200 R. P. M. is employed.

It is to be understood that the degree of fineness of removed topsoil attained by the hammer mill can be regulated, according to the type of crop to be sown, by altering the speed of the hammer mill. Similarly, other means for driving the hammer mill may, of course, be employed. For example, on larger versions of the apparatus constituting this invention a diesel engine would be preferable. In smaller types the hammer mill can be powered from the tractor motor through the usual take-off shaft, thereby eliminating the necessity of a separately mounted motor.

Following the rear supporting wheels is a ground tamper 330 of drum type. When the rear wheels are in raised position or the position shown in Figure 1, the element 330 rests upon the surface of the ground and provides support for the apparatus. It also, of course, performs the important function of tamping the prepared material firmly into place upon the surface. The roller tamper can be of the corrugated type but as here shown is smooth surfaced. It may also be of the type which can be liquid filled to bring it up to the desired weight. In any event, it is mounted upon the necessary axle 332 which in turn is placed in suitable bearings in the two frame members 1 and 2.

It is preferable to position a scraper plate 340 immediately adjacent the tamper as in damp or wet soil surface materials will normally adhere to it. The scraper blade 340 is likewise affixed to the two frame members 1 and 2, having a position relative to the rotary tamper of that shown in Figure 1.

I have also found it most beneficial to provide a feed mechanism by which fertilizer, insecticides, germicides and other chemicals of varying types may be added to the soil removed at the furrow level prior to its entry into the hammer mill. The combination pulverizing and mixing action which follows will, of course, completely intermingle such additional ingredients to the vegetation-soil mixture to provide a mulch of even greater desirability. In the embodiment here shown such feeding device takes the form of a hopper 400, having, of course, an opening 405 at its bottom for emission of the referred to additional ingredients. The hopper is affixed to the two side frame members 1 and 2 by means of two lugs 410 and 411. It is, of course, centered over the conveyor ramp 200 and the referred to opening 405 is positioned at a point on the ramp immediately adjacent the hammer mill, so that these materials are fed into the soil removed and elevated upwardly at a point assuring the most efficient admixture. It is to be understood that the hopper can be provided with controlled feeds, known to those skilled in the art, in order that the amount delivered during operation of this device is constant and proportioned.

From the foregoing description of this invention the operation thereof should be wholly understandable. Briefly, the mechanism is a complete soil preparation device. It can be conveniently towed to the field to be treated with the cutting, digging and subsoiling apparatus in transport position as shown in Figure 2. When adjusting the equipment for use, the hydraulic ram 140 and related link assembly permits simultaneous lowering of coulter, scoop and subsoiling mechanism with great ease and speed. The coulter, in slicing along one or both sides of the furrow to be made, facilitates removal by the scoop of material from the furrow level up to the surface. The forward motion of the apparatus forces such removed material up the floor of the elevator ramp to the hammer mill, the ramp terminating immediately adjacent to the circumference defined by the whirling blades or hammers. Such material is consequently completely reduced to the desired degree of fineness by the mill which, as indicated in Figure 1, rotates in a counterclockwise fashion and discharges this prepared and finely ground topsoil through the chute forming a part of the cover of the mill. In the meantime the subsoiling spikes have been performing a plow operation at the subsoil level so that by the time the ground tamper or roller passes over the prepared ground the seed bed consisting of plowed subsoil, and pulverized topsoil comprising actually a fine mulch, is ready for planting.

Although this invention may be varied in the instances noted and varied as well in many other ways, other expedients or alternates being employed to accomplish the purposes hereof, it is to be understood that my invention is only limited by the scope of the following claim.

What I claim is:

In a soil preparation mechanism, a carriage adapted to be propelled forwardly, coulter means pivoted for vertical movement on one side and at the forward end of said carriage, a centrally located cutting and soil elevating means pivoted for vertical movement and adapted to remove and elevate the surface materials of the soil from the furrow level, hammer mill pulverizing means to grind said materials to a predetermined degree of fineness, a subsoil plow means below and affixed to said elevating means, said subsoil plow means being adapted to plow said soil to the subsoil level, said subsoil plow means comprising a series of transverse supports underneath and affixed to said elevating means, plow blades on said supports, said plow blades being mounted on axially aligned horizontal pivots, transverse pins on each of said blades adjacent to and parallel to said pivots, tension spring means in interconnection with said elevating means at one end thereof and with each of said pins at the other end thereof whereby said blades are maintained in normal digging position by said tension means but may pivot upwardly upon application of predetermined rearward pressure, means to simultaneously raise and lower said coulter, elevating means and subsoil plow means to transport and operative positions respectively, said last named means including a shaft, a link means connecting said coulter and elevating means with said shaft, a hydraulic cylinder adapted to rotate said shaft whereby upon actuation of said cylinder and said shaft the coulter, elevating and plow means are simultaneously propelled in the same direction of travel to operative and inoperative positions.

(References on following page)

References Cited in the file of this patent

UNITED STATES PATENTS

| | | |
|---|---|---|
| 1,088,767 | Bradford | Mar. 3, 1914 |
| 1,303,149 | August | May 6, 1919 |
| 1,303,150 | August | May 6, 1919 |
| 1,597,234 | Hicks | Aug. 24, 1926 |
| 1,687,422 | Bensien | Oct. 9, 1928 |
| 1,761,286 | Zuckerman | June 3, 1930 |
| 2,154,720 | Biles | Apr. 18, 1939 |
| 2,401,653 | Mohler | June 4, 1946 |
| 2,563,926 | Elliott et al. | Aug. 14, 1951 |
| 2,602,388 | Elliott et al. | July 8, 1952 |

FOREIGN PATENTS

| | | |
|---|---|---|
| 87,113 | Germany | June 10, 1896 |
| 363,475 | Great Britain | Dec. 24, 1931 |